F. W. FRENCH.
WHEEL.
APPLICATION FILED DEC. 14, 1917.

1,310,069. Patented July 15, 1919.

Inventor
Fred W. French
By Moulton & Lurrane
Attorneys.

UNITED STATES PATENT OFFICE.

FRED W. FRENCH, OF GRANDVILLE, MICHIGAN.

WHEEL.

1,310,069. Specification of Letters Patent. Patented July 15, 1919.

Application filed December 14, 1917. Serial No. 207,063.

*To all whom it may concern:*

Be it known that I, FRED W. FRENCH, a citizen of the United States of America, residing at Grandville, in the county of Kent and State of Michigan, have invented certain new and useful Improvements in Wheels; and I do hereby declare the following to be a full, clear, and exact description of the invention, such as will enable others skilled in the art to which it appertains to make and use the same.

This invention relates to vehicle wheels and is particularly concerned with wheels for motor vehicles of the type termed "demountable". Wheels of this character may be mounted on or removed from hubs therefor, said hubs being properly mounted upon the vehicle so that in the event that a wheel becomes broken or otherwise incapable of service, or if a tire is either temporarily or permanently injured so as to be useless, the wheel may be removed from the hub and replaced by another.

The present invention is concerned with the construction of the wheel, and it is a primary object and purpose thereof to so construct the wheel that it is strongly reinforced and capable of maintaining its form under all conditions. Inasmuch as the wheels, as carried on a motor vehicle, consist only of the spokes and surrounding rim on which the tire is mounted, it is evident that the construction of the wheel adjacent the hub portion thereof is weak and is liable to become defective, particularly through swelling and shrinkage of the spokes under varying weather conditions. My invention is directed toward the strengthening of the wheel adjacent the hub portion thereof, and this in a particularly simple, efficient and economical manner.

For an understanding of the invention and the construction which embodies the same, reference may be had to the accompanying drawing in which.

Like reference characters refer to like parts in the different views of the drawing.

Figure 1:
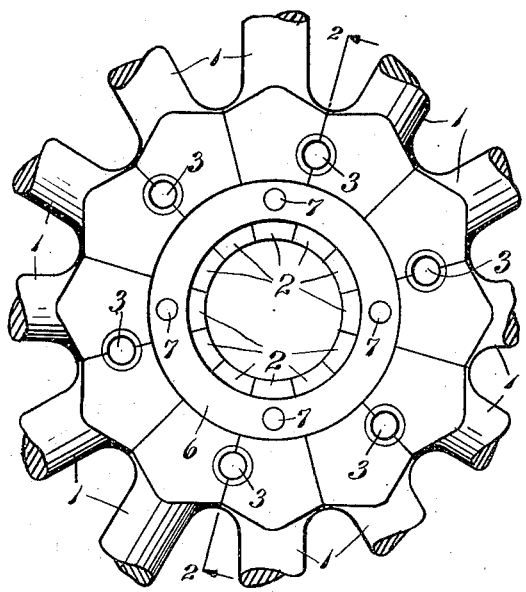
Figure 1 is a side elevation of the hub portion of a wheel equipped with my invention.
Figure 2:
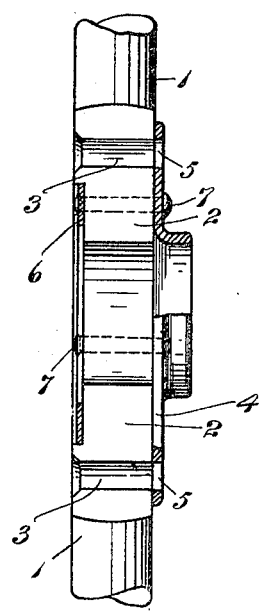
Fig. 2 is a section taken substantially on the line 2—2 of Fig. 1.
Figure 3:
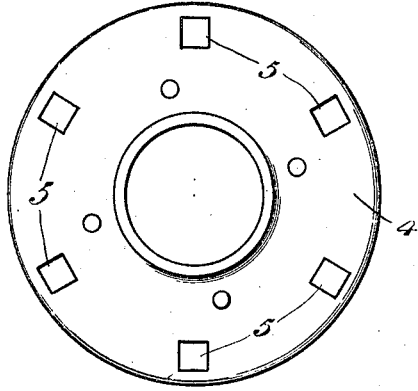
Fig. 3 is a side view of the outer flange member of the wheel.
Figure 4:
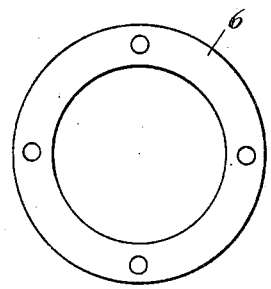
Figs. 4 and 5 show, respectively, a plan and edge view of the reinforcing rim which forms one element of the wheel construction.
Figure 5:

In the construction of the wheel a plurality of radially disposed spokes are used which come together at the inner ends 2 thereof, being formed and fitted together making a solid disk. Transverse openings 3 are bored between adjacent sides of certain of the spokes for the passage of connecting bolts by means of which the wheel may be attached to a wheel hub. In addition a central opening is made in the disk through which the wheel hub passes.

On one side of the disk a flange 4 is placed, it also being provided with a central opening in alinement with the central opening in the disk and further with a plurality of openings 5 which are adapted to register with the transverse openings 3 heretofore described. On the opposite side of the disk a ring 6 of flat metal is placed, being disposed within an annular recess cut in the side of the disk so that the ring lies below, or at least flush with, the adjacent surface of the disk. Rivets 7 pass through certain of the spokes and through the flange 4 and ring 6, being headed over at both ends so as to permanently connect the ring, wheel, and flange together.

A wheel of the character noted is very strong and durable and the construction described serves to hold the meeting ends of the spokes in proper relation to each other at all times irrespective of the weather conditions to which they may be subjected. The ring 6 is out of the way, and the hub flange, which when the wheel is connected to the hub lies alongside the wheel disk, covers the ring completely and the ring does not interfere with it in any manner. It is of course to be understood that this hub flange mentioned covers practically the whole side of the wheel disk, the same as does the flange 4, connecting bolts extending through the same and through the transverse openings 3 and the openings 5 in the flange 4. This wheel can be carried upon a motor vehicle and exposed, as it necessarily must be, to the elements, yet at the same time it will retain its shape and there is no danger of the meeting ends of the spokes becoming displaced or otherwise out of alinement.

I claim:

1. A demountable wheel comprising a plurality of radially disposed spokes, the inner ends of which meet to form a solid disk with a central opening therethrough, said disk having an annular depression in its inner side surrounding the opening through said disk, a flat ring seated in said depression, a flange having a central opening therethrough located against the opposite outer side of the disk, and rivets passing through the ring, flange and disk permanently connecting the same together.

2. A demountable wheel comprising a plurality of radially disposed spokes, the inner ends of which meet to form a solid disk with a central opening therethrough said disk having an annular depression in its inner side surrounding the opening therethrough and provided with a plurality of transverse openings between the spokes, a flange having a central opening located against the outer side of the disk and also provided with a plurality of openings, one for each of said transverse openings, through the disk, a ring received within the depression, and rivets passed through certain of the spokes and through said ring and flange for permanently connecting the same together, said openings in the flange registering with the transverse openings through the disk, substantially as described.

In testimony whereof I affix my signature.

FRED W. FRENCH.

Copies of this patent may be obtained for five cents each, by addressing the "Commissioner of Patents, Washington, D. C."